United States Patent
Barnes et al.

(10) Patent No.: US 7,213,750 B1
(45) Date of Patent: May 8, 2007

(54) SPENDING ACCOUNT SYSTEMS AND METHODS

(75) Inventors: Brian T. Barnes, South Jordan, UT (US); Peter B. Evans, New York, NY (US); Elliott Glazer, Chesterfield, VA (US); William Jody Gray, Salt Lake City, UT (US); Jason Stephen Jagatic, Hoboken, NJ (US); Dana J. Klaboe, Brooklyn, NY (US); Lisa Frances Marchese, Bangali, NY (US); Leigh Reynolds Malnati, Mountain Lakes, NJ (US); Elizabeth J. Taxin, New York City, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 86 days.

(21) Appl. No.: 10/904,639

(22) Filed: Nov. 19, 2004

Related U.S. Application Data

(60) Provisional application No. 60/541,548, filed on Feb. 3, 2004, provisional application No. 60/523,812, filed on Nov. 19, 2003.

(51) Int. Cl.
*G06K 5/00* (2006.01)
(52) U.S. Cl. .................................. 235/381; 235/380
(58) Field of Classification Search ............... 235/383, 235/379, 380, 381; 705/2, 4, 42, 35, 40, 705/39
See application file for complete search history.

(56) References Cited

U.S. PATENT DOCUMENTS

| | | |
|---|---|---|
| 5,857,079 A | 1/1999 | Claus et al. |
| 5,903,830 A | 5/1999 | Joao et al. |
| 6,154,732 A | 11/2000 | Tarbox |
| 6,208,973 B1 | 3/2001 | Boyer et al. |
| 6,339,766 B1 | 1/2002 | Gephart |
| 6,343,279 B1 | 1/2002 | Bissonette et al. |
| 6,353,811 B1 | 3/2002 | Weissman |
| 6,422,462 B1 | 7/2002 | Cohen |
| 6,442,526 B1 | 8/2002 | Vance et al. |
| 6,601,761 B1 | 8/2003 | Katis |
| 6,615,190 B1 | 9/2003 | Slater |
| 2001/0014873 A1 | 8/2001 | Henderson et al. |
| 2002/0016764 A1 | 2/2002 | Hoffman |
| 2002/0087444 A1 | 7/2002 | DiPiero et al. |
| 2002/0099659 A1 | 7/2002 | Swentor |
| 2002/0147678 A1 | 10/2002 | Drunsic |
| 2002/0174030 A1 | 11/2002 | Praisner et al. |
| 2002/0198831 A1 | 12/2002 | Patricelli et al. |
| 2003/0018567 A1 | 1/2003 | Flitcroft et al. |
| 2003/0033272 A1 | 2/2003 | Himmel et al. |
| 2003/0061153 A1 | 3/2003 | Birdsong et al. |

(Continued)

*Primary Examiner*—Thien M. Le
(74) *Attorney, Agent, or Firm*—Sterne, Kessler, Goldstein & Fox P.L.L.C.

(57) ABSTRACT

A system which facilitates the purchase of an item qualifying for pre-tax treatment utilizing at least one flexible spending account (FSA). A host computer may receive a request from a point of sale (POS) device to authorize payment for one or more items. The host computer may process the request to determine if the item qualifies for pre-tax treatment. If the item qualifies for pre-tax treatment, the host computer may transmit payment authorization to the POS device and debit at least one FSA and/or at least one non-FSA account.

25 Claims, 4 Drawing Sheets

U.S. PATENT DOCUMENTS

| | | |
|---|---|---|
| 2003/0061358 A1 | 3/2003 | Piazza et al. |
| 2003/0088487 A1 | 5/2003 | Cheng et al. |
| 2003/0135459 A1 | 7/2003 | Abelman et al. |
| 2003/0187695 A1 | 10/2003 | Drennan |
| 2003/0195769 A1 | 10/2003 | Francis |
| 2003/0216997 A1 | 11/2003 | Cohen |
| 2004/0249745 A1* | 12/2004 | Baaren .................. 705/39 |
| 2005/0038740 A1* | 2/2005 | Ogilvie .................. 705/40 |
| 2005/0098621 A1* | 5/2005 | de Sylva ................ 235/379 |
| 2005/0256794 A1* | 11/2005 | Colby .................... 705/35 |
| 2006/0064332 A1* | 3/2006 | Schoenbaum et al. ..... 705/4 |
| 2006/0076400 A1* | 4/2006 | Fletcher ................ 235/379 |
| 2006/0085335 A1* | 4/2006 | Crawford et al. ......... 705/40 |

\* cited by examiner

SPENDING ACCOUNT SYSTEMS AND METHODS

CROSS REFERENCE TO RELATED APPLICATIONS

This application claims priority to, and the benefit of, U.S. Provisional Application Ser. No. 60/523,812, filed Nov. 19, 2003, and U.S. Provisional Application Ser. No. 60/541,548, filed Feb. 3, 2004, both of which are hereby incorporated by reference.

FIELD OF INVENTION

The application generally relates to point of sale purchases, and more particularly, to transactions utilizing a payment instrument to access funds in at least one flexible spending account.

BACKGROUND OF INVENTION

Section 125 of the United States Internal Revenue Code offers tax savings to employees for medical, dependent care and childcare expenses. Likewise, Section 132 of the United States Internal Revenue Code offers employees tax savings for work-related parking and transportation expenses. For example, employees may be entitled to tax benefits if the employees withhold a portion of their payroll to pay for medical, dependent care, childcare, work-related parking expenses and/or work-related transportation expenses. In other words, the employees' payroll is taxed on the amount left after the withheld portion is subtracted from the payroll amount and the withheld portion is placed into a flexible spending account (FSA).

A FSA is an account set up to hold the withheld portions, and to pay for certain categories of items that qualify for pre-tax treatment under the Internal Revenue Service Guidelines. As it currently stands, if an employee wishes to, for example, establish both a FSA for qualifying childcare expenses and a FSA for qualifying medical expenses, the employee must establish two FSAs and designate how much of the employee payroll to withhold and credit to each FSA. The employee may then withdraw the funds held in each FSA as the employee purchases qualifying items associated with each respective FSA.

Currently, to withdraw funds held in a FSA for qualifying expenses, the employee typically must first purchase the qualifying item, then request the FSA administrator to reimburse the employee for the purchase. More specifically, the employee is usually required to pay for the item at the point of sale, complete and file a claim form along with the sales receipt, wait for the FSA administrator to process and approve the claim, and wait to receive reimbursement. Thus, the current process for withdrawing FSA funds for qualifying expenses is time consuming, requires the employee to be "out of pocket" until reimbursement arrives, and necessitates that the employee perform various tasks after the purchase. Furthermore, in situations where the employee incurs a claim for expenses in different types of FSAs (e.g., a medical expense FSA and a childcare FSA), the employee is generally required to file two claims, one for each respective FSA, following the above steps.

Thus, there is a need for systems and methods for automatically accessing funds held in a FSA at the point of sale, and specifically, by utilizing a single payment instrument (e.g., a debit card, credit card, charge card, FSA card, RFID, etc.) at the point of sale. In addition, there is a need to access multiple FSAs for different categories of qualifying items utilizing a single payment instrument. Furthermore, there is a need for accessing one or more FSAs and/or one or more non-FSAs utilizing a single payment instrument.

SUMMARY OF INVENTION

The invention provides systems and methods to facilitate consumer access to funds held in at least one flexible spending account (FSA) while at a point of sale. A FSA may be opened by a consumer to pay for items qualifying for pre-tax treatment (e.g., prescriptions, childcare, parking, etc.). In one exemplary embodiment, the system may allow a consumer to directly access funds in the FSA at a point of sale to purchase items qualifying for pre-tax treatment.

To facilitate direct access to the funds stored in a FSA, a payment instrument may be linked to at least one FSA, and amounts held therein may be accessed for payment when a valid charge is executed utilizing the payment instrument. The payment instrument may be, for example, a debit card, a credit card, a charge card, a FSA card, a RFID, a chip based card, a stored value card, and the like.

When the consumer purchases an item, the consumer may present the payment instrument as payment to a merchant. The merchant may enter the transaction data into a point of sale (POS) device. The POS device may then transmit a request for payment authorization, which may include any portion of the transaction information, to a host computer. Once the request for payment authorization is received, the host computer may determine whether the item being purchased qualifies for pre-tax treatment. If at least one item qualifies for pre-tax treatment, the host computer may transmit payment authorization to the POS device and may debit at least one FSA for the authorized amount. In addition, the host computer may debit at least one non-FSA account for an item which does not qualify for pre-tax treatment, yet may be included in the request for payment authorization.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

The detailed description of exemplary embodiments of the invention herein makes reference to the accompanying drawings and figures, which show the exemplary embodiments by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

For the sake of brevity, conventional data networking, application development and other functional aspects of the systems (and components of the consumer operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Figure 1:
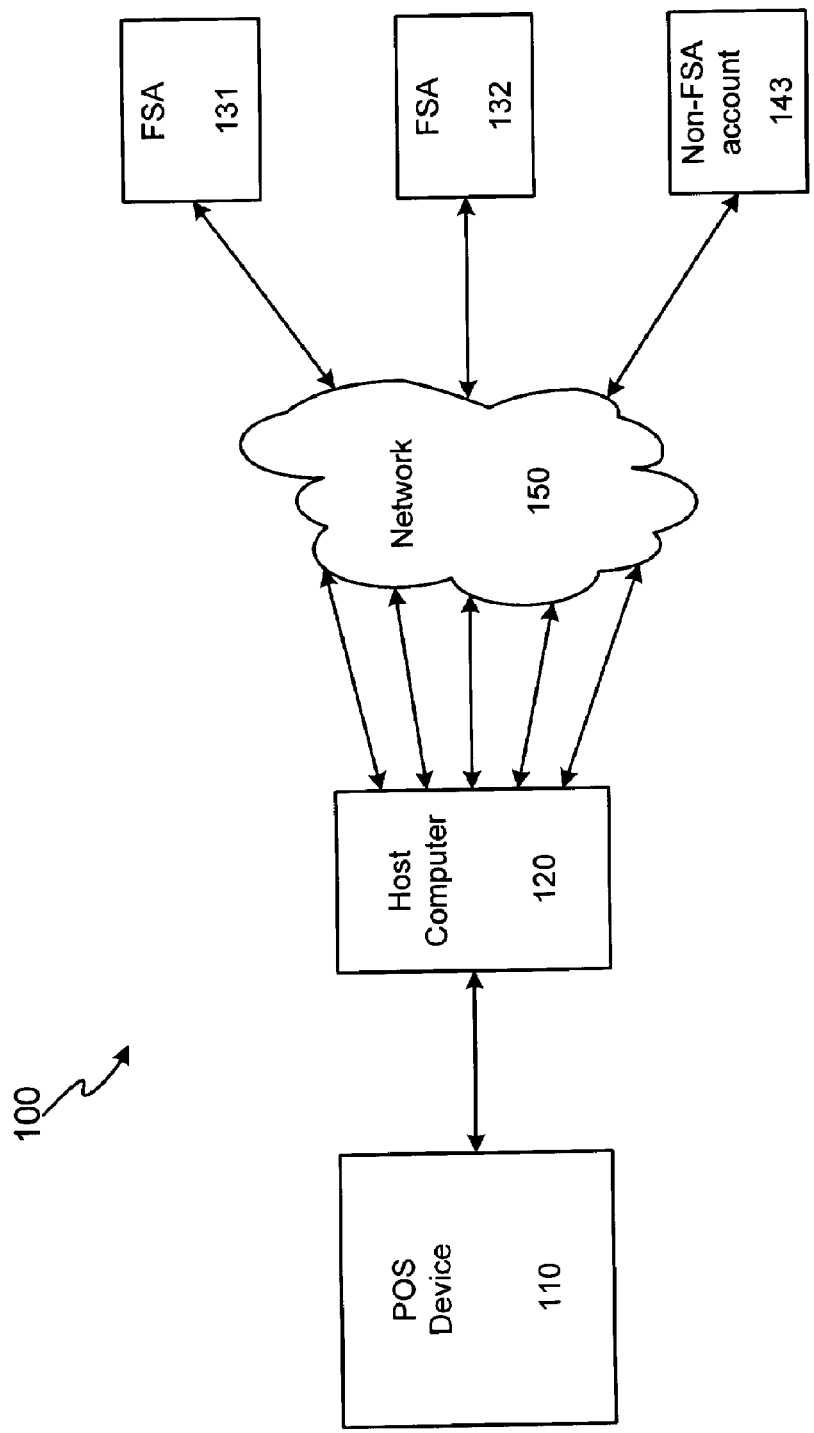
FIG. 1 is a block diagram illustrating an exemplary system configured to facilitate a purchase utilizing a flexible spending account.

Turning now to the figures, FIG. 1 is a block diagram illustrating an exemplary embodiment of a system 100 which utilizes at least one merchant point of sale (POS) device 110 to facilitate the purchase of at least one item utilizing one or more flexible spending accounts. In one embodiment, system 100 may facilitate the secure payment and funding services using a pre-funded account (e.g., FSA 131, discussed below) while substantially protecting the privacy of the transaction participants. The comprehensive payment service may be based upon a consolidated account that stores value to be used in on-line and off-line transactions. System 100 may also include processes for authenticating participants, authorizing transactions, and settling payments. As such, embodiments of the present invention may enable merchants to effectively accept non-standard forms of payment at POS device 110 without changing their current payment infrastructures. Embodiments of the present invention may also enable the provision of value for purchases at any network merchant using a variety of sources of value. For further information related to these features, see the patent application entitled CONSOLIDATED PAYMENT ACCOUNT SYSTEM AND METHOD, by inventors: David Armes, et al., filed on Jun. 21, 2002 as Ser. No. 10/176,729, which is hereby incorporated by reference.

POS device 110 may be any software and/or hardware suitably configured to facilitate a purchase. In one embodiment, POS device 110 may be configured to receive payment data and/or transaction data. POS device 110 may also be configured to transmit a request for payment authorization, which may include payment data and transaction data, to at least one host computer 120. As used herein, "transmit" may include sending electronic data from one system component to another over a network connection. Additionally, as used herein, "data" may include encompassing information such as commands, queries, files, data for storage, and the like in digital or any other form. "Transaction data" may include, for example, the amount of purchase, at least one payment instrument account number, at least one payment account number, at least one item identifier for each item being purchased, loyalty information, demographic information and/or any other data helpful in processing a transaction. POS device 110 may be a consumer computing unit in the form of a personal computer, although other types of computing units may be used including laptops, notebooks, hand held computers, set-top boxes, cellular telephones, touch-tone telephones and the like. Moreover, POS device 110 may be a merchant computing unit implemented in the form of a computer-server, although other implementations are contemplated. Moreover, reference to a single POS device, host computer, item or any other component may include one or more POS devices, host computers, items or other components, respectively.

A payment instrument may be associated with, for example, one or more of a flexible spending account (FSA) having an account number, an FSA card, a credit card, a debit card, a charge card, a RFID, a chip based card, a stored value card and/or any other instrument capable of being presented for payment of an item. The payment instrument may be co-branded, include the issuer and employer logo, and/or other trademarks. In addition, the payment instrument may be linked to at least one FSA and/or at least one non-FSA account, both of which are discussed in greater detail below. A payment account may include a transaction instrument-less payment account wherein account information (e.g., account number) may be entered into POS device 110 without using, for example, a card or other physical instrument. In one embodiment, the account may sit on Triumph, and not have any instrument associated with the account. An "account" or "account number", as used herein, may include, for example, any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a fob having a transponder and RFID reader in RF communication with the fob. Although the present invention may include a fob embodiment, the invention is not to be so limited. Indeed, system may include any device having a transponder configured to communicate with RFID reader via RF communication. Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include, but are not limited to, watches, Internet enabled kitchen appliances, restaurant tables embedded with RF readers, wallets or purses with imbedded transponders, etc.

The account number may be distributed and stored in any form of plastic, electronic, magnetic, radio frequency, wireless, audio and/or optical device capable of transmitting or downloading data from itself to a second device. A consumer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type, etc. In this example, the last (sixteenth) digit is used as a sum check for the sixteen-digit number. The intermediary eight-to-ten digits are used to uniquely identify the consumer. A merchant account number may be, for example, any number or alpha-numeric characters that identifies a particular merchant for purposes of card acceptance, account reconciliation, reporting, or the like.

As used herein, an "item" may be one or more information, good and/or service capable of being exchanged between entities. In addition, an "item identifier" may include, for example, one or more universal product code (UPC), a stockkeeping unit (SKU), a serial number, a reference number, a category number, a service type indicator, a description and/or other any other information capable of identifying an item.

System 100 may also include a host computer 120. Host computer 120 may be any hardware and/or software suitably configured to communicate and/or process transaction information. In an exemplary embodiment, host computer 120 (or any other computer component discussed herein) may include a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Furthermore, though shown as a main frame computer, host computer 120 may be implemented in other forms, such as a mini-computer, a PC server, a network of computers located in the same of different geographic locations, or the like.

In one exemplary embodiment, host computer 120 may be configured to receive and process a request for payment authorization from POS device 110. An electronic commerce system may be implemented at POS device 110 and host computer 120. In an exemplary implementation, the electronic commerce system is implemented as computer software modules loaded onto POS device 110 and host computer 120. Host computer 120 may not require any additional software to participate in any online commerce transactions supported by an electronic commerce system. Host computer 120 may also be configured to compare an item identifier received from POS device 110 to a list of item identifiers for items qualifying for pre-tax treatment stored within memory of host computer 120. Furthermore, host computer 120 may include rules and/or algorithms for searching and/or comparing a list of stored item identifiers to an item identifier received from POS device 110. Host computer 120 may additionally be configured to transmit full or partial payment authorization, and/or at least one appropriate decline message to POS device 110.

An "item qualifying for pre-tax treatment" may include any item that may be purchased with untaxed payroll funds. In one embodiment, an item qualifying for pre-tax treatment is an item included in the Internal Revenue Service Guidelines, which may be changed over time. In addition, an item qualifying for pre-tax treatment may be set and/or changed by any person or entity. Furthermore, an item qualifying for pre-tax treatment may originate at the employer, any third party that may administer the FSA, and/or a tax related servicing entity. However, some additional restrictions on coverage may be defined by the employer because the employer may assume the legal risk for some payments. In one embodiment, an information card may be distributed to employees, employers, and/or FSA administrators explaining which expenses and/or items qualify for pre-tax treatment.

System 100 may be configured to allow an employer, consumer and/or any other person or entity with certain access rights to FSA 131 to override any decline (e.g., denial of verification) and allow the request for payment to be authorized. In this regard, system 100 may also include an online service accessible via any network (e.g., network 150, discussed below) that allows the employer, consumer and/or third party to check a FSA and charges that were applied against/debited from the FSA, with an opportunity to adjust and/or enter other charges incurred on the payment instrument for this purpose as well (e.g., in case the issuer or acquirer did not recognize a charge properly).

Other features may include, for example, a consumer or a third party to provide approval to charge an account when a billing amount is determined (e.g., after adjudication of the claim); different awards or loyalty features for non-healthcare spending and/or for healthcare spending; preferred member pricing; services multiple players and change of payers (e.g., open enrollment); payer-funded (possibly co-branded) identification features, using the payer's provider portals and other available resources; external integration tools; checking co-pays; checking eligibility status; combine with insurance and/or FSA; rollover allowed or determined by employer; ability to access and draw from multiple FSA and health savings accounts (HSAs); automatic identification of healthcare transactions; roll up accounts into a corporate hierarchy; link flexible spending accounts to existing consumer or corporate accounts; and, routing transactions to different third party accounts.

In one exemplary embodiment, host computer 120 may be configured to debit multiple FSAs according to a predetermined, random or rule based order. Moreover, host computer 120 may be configured to provide a discount to FSA 131, and/or be configured to receive a transaction fee from one or more entities associated with host computer 120. In the set-up of a registration profile, specialized FSAs may be targeted and pre-authorized for specific transaction types and/or items. In addition, post-issue modifications may also be available.

Host computer 120 may also be configured to automatically develop receipts, wherein the receipts may be required for tax purposes and for use related to FSA 131. The receipt may be a confirmed record which lists disputes and other post sale actions. In one embodiment, the receipt may be consolidated and may be configurable. The consolidation may be across multiple FSAs which may be applicable with, for example, corporate accounts or a Small Business Services (SBS). Host computer 110 may issue an end of year statement for the consumer as receipt tracking. In one embodiment, host computer 120 may archive in a database a ROC (receipt of charge) associated with a charge in FSA 131 and, if necessary, help as receipt backup for tax purposes. As such, the additional ROC information along with the statements from host computer 120 provide added value. Host computer 120 may charge the consumer a fee for the archival services or any other services discussed herein. In one embodiment, host computer 120 may supply line item detail statements at the end of the year, wherein the statement discloses each purchase. The service may only be available for certain levels of consumers or certain levels of transaction instruments (e.g., Gold and Platinum cards). Any charges may be paid directly out of FSA 131 using existing or customized stored value systems.

In an exemplary embodiment, host computer 120 may be configured to generate a report detailing transactions occurring within a specified period of time. Reporting may include similar technology and systems as are known in the art for corporate payment instrument reporting. For example, the administrator of host computer 110 may have a reporting relationship at the consumer level and/or corporate level. The consumer level may include monthly statements for each FSA. The statements may be in electronic (e.g. XMS) or paper (e.g., international) form and sent out to the consumer via mail, email, pager or any other communication system or method known in the art. The statements may detail merchant, date, time, and/or amount. In one embodiment, the statements may not include consumer components of the transaction. At the corporate level (e.g., the employer), the system may help corporations manage their expense base with, for example, logistics, reporting tools, etc. A degree of flexibility may exist as to how the corporation desires to manage the accounts. For example, the corporation may settle the account directly and be responsible for reviewing the eligibility of each charge (e.g. for internal employees) or the individual employee may be responsible for settling the account balance and then apply to the corporation for reimbursement of the eligible expenses. Host computer 120 may help the corporation manage their expense base by reporting on the nature of the transactions across their employee base over a certain period of time (e.g. quarterly, annually, etc). The report may include information such as, for example, certain expenses represent x % of their expense base and are split across six suppliers. As such, if they were to establish a preferred supplier arrangement with for example, three pharmaceutical manufacturers, they may reduce their expense base. To maintain privacy, host computer 120 may customize the reporting so as to firewall certain detail from employers (or their outsourced expense review administrators), but still release sufficient information to make it valuable for expense base tracking and management.

Host computer 120 may also be configured to allow the consumer to pay on their personal computer with automatic payment tracking. For example, the consumer may pay online for prescriptions like Express Scripts or at a doctor's office using a payment instrument.

Host computer 120, in an exemplary embodiment, may be configured to communicate with FSA 131 and/or non-FSA account 143, determine an appropriate FSA 131 and/or non-FSA account to debit for each received request for payment authorization, and/or debit FSA 131 and/or non-FSA account 143 for an authorized payment amount. Similarly, any reference to FSA 131 or non-FSA account may also include at least one additional FSA (e.g., FSA 132) or non-FSA account (not shown).

FSA 131 may be any software and/or hardware suitably configured to manage records relating to funds. FSA 131 may be configured to store pretax dollars, and a consumer may establish FSA 131 by specifying a pre-tax amount to be deducted from his/her payroll, and credited to FSA 131. The deducted amount(s) may be held in an employer account, similar to the handling of other deductions, and may be released by the employer for expenditures of items qualifying for pre-tax treatment. As used herein, the terms "employer", "end user", "consumer", "customer", "cardmember", "business" or "merchant" may be used interchangeably with each other, and each shall mean any person, entity, machine, hardware, software or business.

In another embodiment, FSA 131 may be a line of credit account having a line of credit issued to it wherein a consumer may utilize FSA 131 similar to, for example, a charge card or credit card. The line of credit may be issued to FSA 131 by the administrator of FSA 131 or any other entity capable of extending a line of credit to FSA 131. One skilled in the art will appreciate that a "line of credit account" may include a card account, a demand deposit account, a credit line, a money market account, a digital cash account, and/or any other financial account capable of accepting funds or other value that may be converted to funds. One skilled in the art will also appreciate that the word "value" as used herein refers to funds as well as any goods, services, funds, trade credits and accounts receivable that could reasonably be converted to or measured as funds. As a quantity, value refers to the quantity of funds that could reasonably be derived through conversion of the goods, services, funds, trade credits and accounts receivable to funds.

FSA 131 may also be configured to communicate with host computer 120 and be debited by host computer 120 for items qualifying for pre-tax treatment. In one embodiment, once a transaction including an item qualifying for pre-tax treatment is approved, the funds may be debited through an automated clearinghouse from FSA 131. Most employers have 3–10 days worth of history on hand and a pre-deposit may be collected from the employer. To reduce the number of non-eligible expenses, a service may exist that focuses on real-time authorization. For example, host computer 120 may obtain data and reject it based on a non-match at the point of sale. The "data" may include links to third party information (e.g., Pharmacy Benefit Managers or PBMs) to facilitate processing prescriptions and advising at least one pharmacy about how much to charge for the medication. If the cost matches the billed amount, and the transaction is payable to a pharmacy, then the charge may be validated. Insurance companies may also provide the same type of validation information. Substantiation data may also be LID (line item detail) data associated with a charge. If these checks were to fail, the system may revert to the current process of having the consumer send in receipts to a third party administrator.

Other current offerings may split the approval and authorization (is it a valid expense) into two separate steps. An interim payment processor based system may include systems from, for example, Evolutions Benefits, Medi-Bank and Smart-Flex. These companies offer a product that is used by a third party administrator to review receipts. To handle the entire end-to-end process, system 100 may include an issuing institution on a financial network. System 100 may also provide a FSA and a non-FSA account on the same financial account and/or linked to the same payment instrument.

FSA 131 may be managed and/or linked to funding sources in various ways, such as, for example, U.S. Ser. No. 10/318,480, filed on Dec. 13, 2002 by Berardi et al. and entitled "SYSTEM AND METHOD FOR ASSIGNING A FUNDING SOURCE FOR A RADIO FREQUENCY IDENTIFICATION DEVICE"; U.S. Ser. No. 10/318,432 filed on Dec. 13, 2002 by Berardi et al. and entitled "SYSTEM AND METHOD FOR SELECTING LOAD OPTIONS FOR USE IN RADIO FREQUENCY IDENTIFICATION IN CONTACT AND CONTACTLESS TRANSACTIONS", both of which are attached and hereby incorporated by reference. Also, see attached documents which disclose inventions related to "SYSTEMS AND METHODS FOR MANAGING MULTIPLE ACCOUNTS ON A RF PAYMENT INSTRUMENT" by Beenau, et al. and "SYSTEMS AND METHODS FOR PROVIDING A RF TRANSACTION DEVICE OPERABLE TO STORE MULTIPLE DISTINCT ACCOUNTS" by Beenau, et al.

In an exemplary embodiment, FSA 131 may be configured to communicate with host computer 120 via a network 150. Network 150 may include, for example, any electronic communications means which incorporates both hardware and software components of such. Communication among the devices in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference. Moreover, system 100 contemplates the use, sale or distribution of an item or information over any network having similar functionality described herein.

The various system devices (e.g., POS device 110, host computer 120, FSA 131 and non-FSA 143) may be independently, separately or collectively suitably coupled to network 150 via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

System 100, in an exemplary embodiment, may include at least one non-FSA account 143. Non-FSA account 143 may be any software and/or hardware suitably configured to hold funds and/or loyalty rewards, and communicate with host computer 120 via network 150. Non-FSA 143 may include, for example, a credit card account, a checking account, a savings account, a charge card account, a retirement account (e.g., a 401K, an IRA, etc.), a loyalty rewards account, an HSA and/or any other type of account capable of being credited and/or debited for a purchase.

In one embodiment, non-FSA account 143 may be configured to have host computer 120 debit non-FSA account 143 for an amount of a non-qualifying item and/or partially qualifying amount. Furthermore, non-FSA account 143 may be configured to cause host computer 120 to credit non-FSA account 143 a discount amount similar to FSA 131 discussed above, or credit non-FSA account 143 with loyalty awards (e.g., loyalty points) in an instance when non-FSA 143 is a loyalty account. In this case, non-FSA account 143 may be any type of loyalty account known in the art. Furthermore, non-FSA account 143 may be a HSA configured to allow withdrawal of funds within the HSA to pay for health related-expenses. In one embodiment, a single payment instrument may be linked to both FSA 131 and non-FSA account 143. For example, a consumer may be capable of accessing funds (or line of credit) in a medical FSA and a HSA using a single FSA card. In another embodiment, FSA 131 may be linked to non-FSA account 143. For example, a single payment instrument (e.g., a credit card, charge card, debit card, etc.) may be utilized to pay for multiple items and charged to a single account (e.g., credit card account, charge card account, checking/savings account, etc.). The charges may be separated by category and debited to the appropriate account. For example, each charge may be evaluated at the end of a specified period of time (e.g., monthly) and then pre-tax qualifying charges may be automatically deducted from FSA 131 and the other charges would remain on non-FSA account 143 (e.g., a credit card account).

System 100 may also be configured such that each device (e.g., POS device 110, host computer 110, FSA 131 and/or non-FSA account 143) is interconnected via a second network, referred to as a payment network. The payment network, which may be part of certain transactions, represents existing proprietary networks that presently accommodate transactions for credit cards, debit cards, and other types of financial/banking cards. The payment network is a closed network that is assumed to be secure from eavesdroppers. Examplary transaction networks may include the American Express®, VisaNet® and the Veriphone® networks.

Various databases used herein may include, for example, client data; merchant data; financial institution data; and/or like data useful in the operation of system 100. As those skilled in the art will appreciate, a user computer may include an operating system (e.g., Windows NT, 95/98/2000, OS2, UNIX, Linux, Solaris, MacOS, etc.) as well as various conventional support software and drivers typically associated with computers. The computer may also include any suitable personal computer, network computer, workstation, minicomputer, mainframe or the like. A user computer may be in a home or business environment with access to a network. In an exemplary embodiment, access is through a network or the Internet through a commercially available web-browser software package.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing consumer files using an ISO/IEC 7816-4 file structure; implementing a domain whereby a dedicated file is selected that exposes one or more elementary files containing one or more data sets; using data sets stored in consumer files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial payment instrument or external to but affiliated with the financial payment instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial payment instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial payment instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain consumers, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the payment instrument user at the stand alone device, the appropriate option for the action to be taken. The present invention may contemplate a data storage arrangement wherein the header or trailer, or header or trailer history, of the data is stored on the payment instrument in relation to the appropriate data.

One skilled in the art will also appreciate that, for security reasons, any databases, systems, devices, servers or other devices of system 100 may consist of any combination thereof at a single location or at multiple locations, wherein each database or system includes any of various suitable security features, such as firewalls, access codes, encryption, decryption, compression, decompression, and/or the like.

System 100 may be described herein in terms of functional block components and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, system 100 may be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, system 100 may be embodied as a customization of an existing system, an add-on product, upgraded software, a stand-alone system, a distributed system, a method, a data processing system, a device for data processing, and/or a computer program product. Accordingly, system 100 may take the form of an entirely software embodiment, an entirely hardware embodiment, or an embodiment combining aspects of both software and hardware. Furthermore, system 100 may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Figure 2:
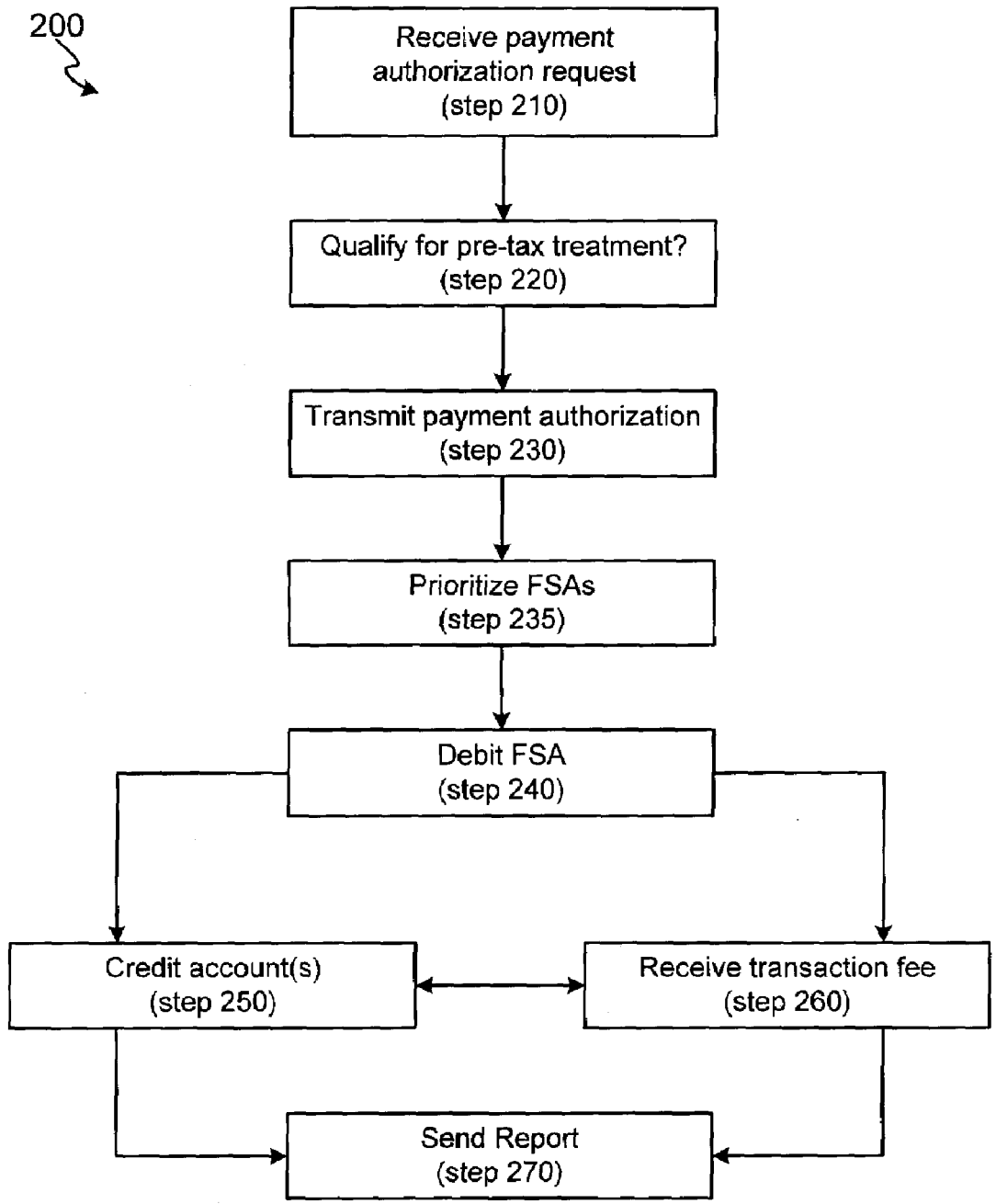
FIG. 2 is a flow diagram illustrating an exemplary method to facilitate a purchase utilizing a flexible spending account.

FIG. 2 is a flow diagram illustrating an exemplary computer-implemented method 200 to facilitate the purchase of an item utilizing a FSA. A host computer (e.g., host computer 120) may receive a request for payment authorization for an item from a POS device (e.g., POS device 110) (step 210). In one embodiment, the request for payment authorization may also include payment data and transaction data. The host computer may process the request for payment authorization to determine if the purchase includes an item qualifying for pre-tax treatment (step 220). In one exemplary embodiment, the host computer may compare an item identifier received from the POS device to a list of item identifiers stored within the host computer to determine if there is a match between an item being purchased and an item qualifying for pre-tax treatment. In other words, to determine if an item being purchased qualifies for pre-tax treatment.

The host computer may transmit full or partial payment authorization to the POS device if there is a match between an item identifier received by the host computer and an item identifier stored in the host computer (step 230). The host computer may transmit full payment authorization if the item being purchased qualifies for pre-tax treatment. In another embodiment, the host computer may transmit only partial payment authorization. Partial payment authorization may occur in situations where an item being purchased does not qualify for pre-tax treatment, and/or where an item being purchased only qualifies for partial pre-tax treatment. In these situations, the host computer may transmit payment authorization only for the amount equal to the proportional cost of an item qualifying for pre-tax treatment, and/or an amount equal to the partially qualifying amount.

Host computer 120 may additionally transmit only partial payment authorization if there are not sufficient funds available in a FSA (e.g., FSAs 131 and/or 132), either individually or collectively, to cover full payment. In this situation, the partial payment authorization may be less than or equal to the FSA credit balance(s), either individually or collectively. In another embodiment, the host computer may transmit full payment authorization, and any deficient amount may be subsequently recovered from the consumer by the administrator of the FSA (if the FSA is debited for the full amount) and/or the administrator of the host computer (if the host computer "covers" the deficient amount).

Host computer 120 may debit a FSA for the full or partial payment authorization amount (step 240). The host computer may debit a single FSA (e.g., FSA 131) for the full payment authorization amount or may debit a first FSA (e.g., FSA 131) for a partial amount and a second FSA (e.g., FSA 132) the remaining amount of the request. In one embodiment, the host computer may debit several FSAs until the host computer has debited the full payment authorization amount. The host computer may determine which FSA to debit based upon the type of item being purchased. For example, the host computer may determine that at least one associated FSA is a medical FSA, and debit the FSA for an amount representing the cost of a qualifying medical item. In addition, in situations where there are multiple items qualifying for pre-tax treatment, the host computer may debit at least one FSA for an amount representing the cost of each qualifying item. In other words, at least one appropriate type of FSA may be debited for each type of qualifying item. For example, host computer 120 may debit at least one medical FSA for an amount representing the cost of each qualifying medical item and at least one dependent care FSA for an amount representing the cost of each qualifying dependent care item included within a single request for payment authorization.

In one exemplary embodiment, the host computer may determine an order in which to debit one or more FSAs (step 235). The order may be established by overall rules about how a FSA is to be used. The order may be based upon the amount of credit within each FSA, such as, use the FSA with the higher/lower amount of credit first. In addition, the order may be based upon at least one date when funds within each respective FSA will expire. For example, an employee may have a FSA from a previous employer (old FSA) and a second FSA maintained by the current employer (current FSA). If the old FSA expires in June, while the current FSA does not expire until December, the two may be linked to a single payment instrument, with rules set up to draw from the old FSA first, and the more current FSA second. The debit amount may be subject to (or re-calculated based upon) any deductibles, prepayments, discounts, coupons, etc.

Host computer 120, in an exemplary embodiment, may credit an amount to a FSA to reflect a discount given to the consumer and/or credit a loyalty account of the customer (step 250). In one embodiment, the discount and/or loyalty credit may be given to the consumer for presenting a particular payment instrument (e.g., an American Express® charge card) as payment for the purchase, for purchasing a particular item, for making a purchase greater than a pre-determined amount, for accumulating purchase amounts greater than a pre-determined amount, and/or for any other reason for providing a discount to a consumer. The discount and/or loyalty credit may be given to the consumer from the payment instrument issuer, manufacturer of the item being purchased, the merchant selling the item, the administrator of the FSA, the government, and/or any other entity that may provide a discount and/or loyalty credit to a consumer.

In another exemplary embodiment, the host computer may receive a transaction fee for each transmitted payment authorization (step 260). The transaction fee may be a set amount, a changing amount, random amount, percentage of the purchase amount and/or the like. In one embodiment, the transaction fee may be received from the merchant requesting payment authorization, the FSA, the FSA administrator, the consumer, and/or any other entity appropriate to charge a transaction fee.

In yet another exemplary embodiment, the host computer may send a report to the consumer, merchant, a government agency and/or administrator of the FSA detailing each transaction (step 270). The report may be sent daily, weekly, monthly, quarterly, semi-annually, annually and/or any other specified period of time.

Figure 3:
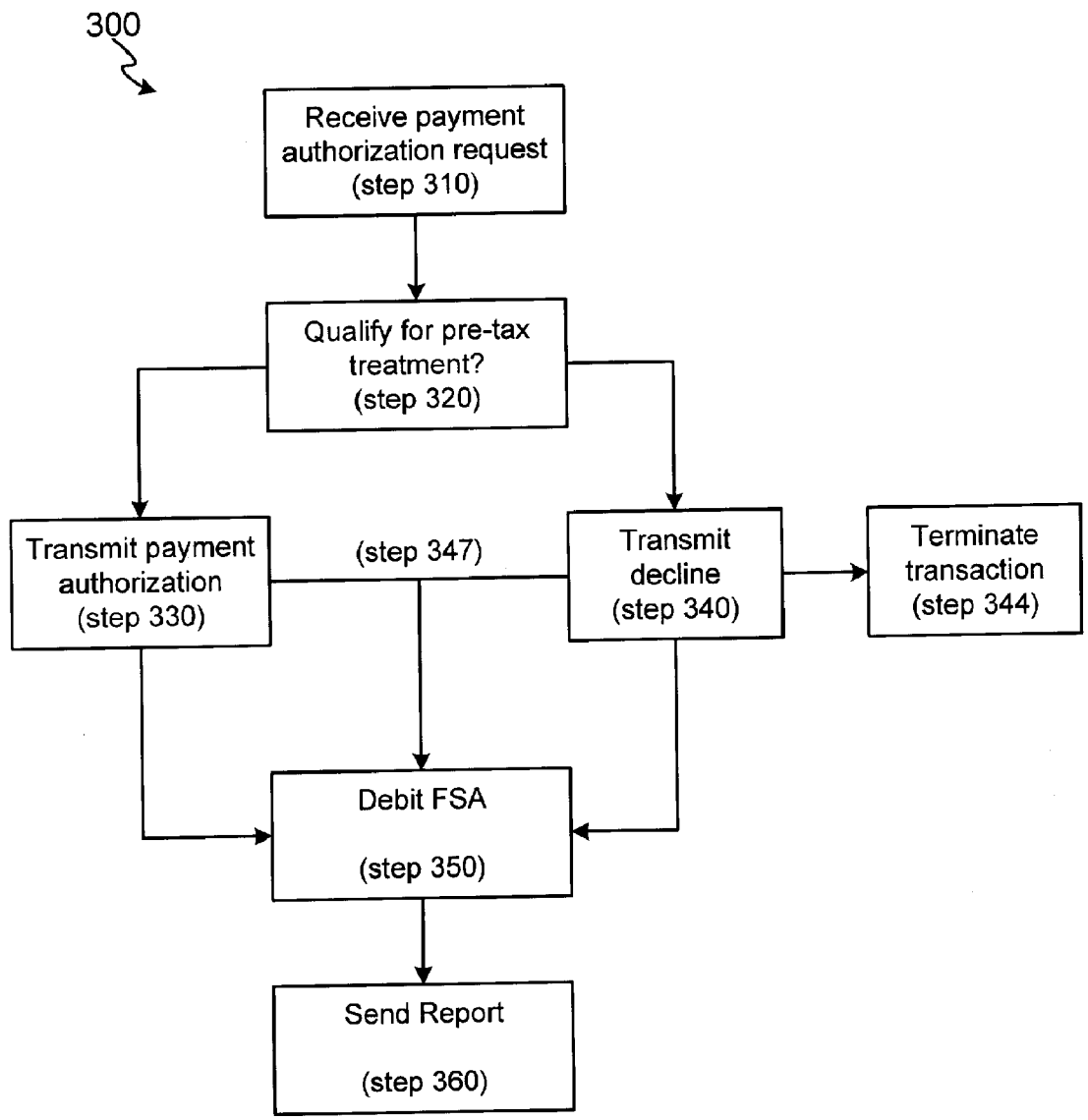
FIG. 3 is a flow diagram illustrating another exemplary method to facilitate a purchase utilizing a flexible spending account.

FIG. 3 is a flow diagram illustrating another exemplary computer-implemented method 300 to facilitate a purchase utilizing a FSA. Host computer 120 may receive a request for payment authorization from a POS device (e.g., POS device 110) similar to step 210 discussed above (step 310). In addition, host computer 120 may determine if an item qualifies for pre-tax treatment similar to step 220 discussed above (step 320). Host computer 120 may also transmit full or partial payment authorization to the POS device similar to step 230 discussed above (step 330).

If the request for payment authorization includes an item that does not qualify for pre-tax treatment and/or an item that only qualifies for partial pre-tax treatment, in one exemplary embodiment, host computer 120 may transmit a "decline" message to the POS device (step 340). The decline message may decline only the amount of the item that does not qualify for pre-tax treatment and/or the non-qualifying partial amount. Moreover, the decline message may decline the entire amount of the payment authorization and terminate the request for payment authorization (step 344). In one embodiment, partial payment authorization may be transmitted by the host computer in accordance with step 330 along with a decline message in accordance with step 340 (step 347). The system may request that the customer pay for all or a portion of the item with another account, then the system may authorize the reduced amount.

In one embodiment, method 300 may also include the host computer debiting at least one FSA for the authorized amount (whether it be full or partial) similar to step 240 discussed above (step 350). In addition, the host computer may also send a report similar to step 270 discussed above (step 360).

Figure 4:
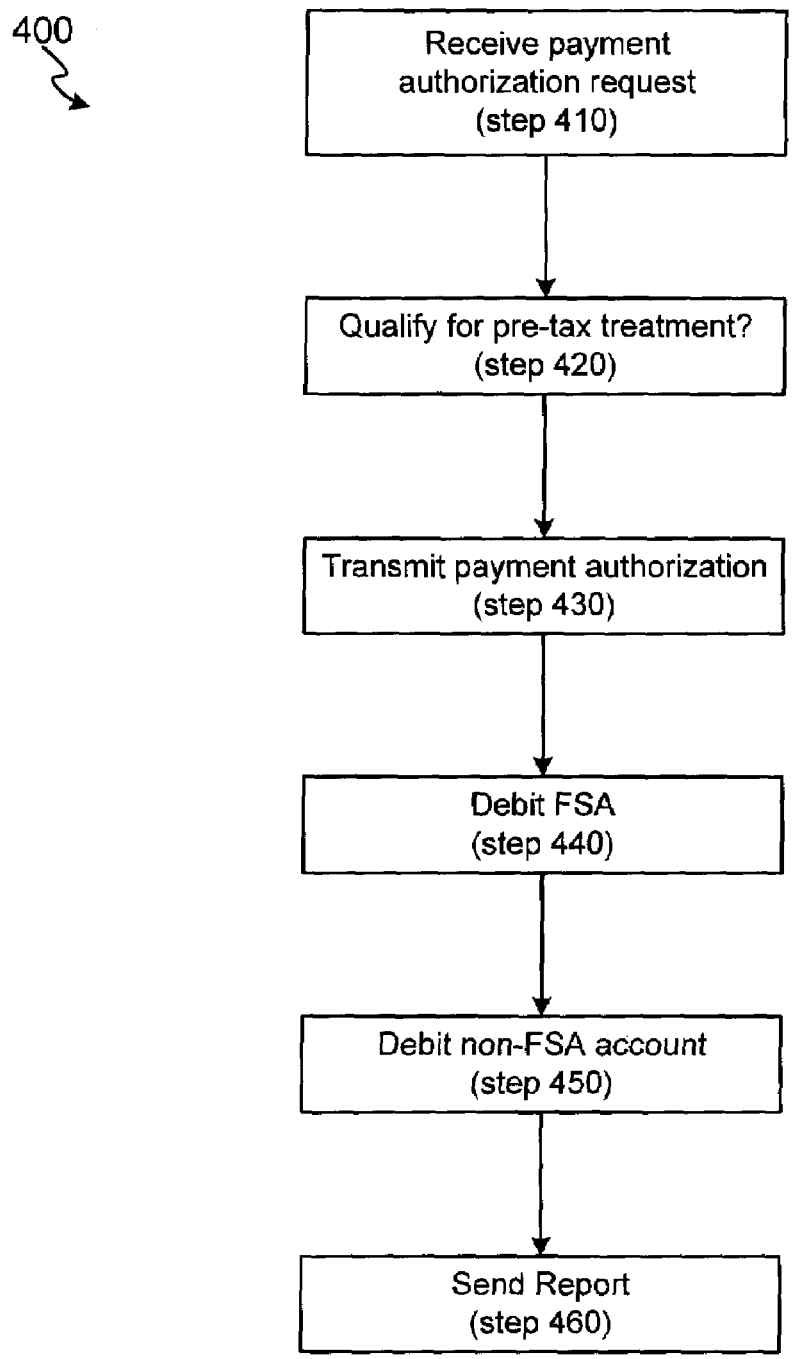
FIG. 4 is a flow diagram illustrating an exemplary method to facilitate a purchase utilizing a flexible spending account and a non-FSA account.

FIG. 4 is a flow diagram illustrating an exemplary computer-implemented method 400 to facilitate a purchase utilizing a FSA and a non-FSA account. Host computer 120 receives a request for payment authorization from a POS device (e.g., POS device 110) similar to steps 210 and 310 discussed above (step 410). Furthermore, the host computer may determine if an item qualifies for pre-tax treatment similar to steps 220 and 320 discussed above (step 420). Moreover, host computer 120 may transmit full or partial payment authorization to the POS device similar to steps 230 and 330 discussed above (step 430), and debit a FSA similar to steps 240 and 350 discussed above (step 440).

In one exemplary embodiment, method 400 may include the host computer debiting a non-FSA account (e.g. non-FSA account 143) for an item not qualifying for pre-tax treatment or for an item that may only qualify for partial pre-tax treatment (step 450). For example, the host computer may debit a non-FSA account for vitamins since vitamins may not qualify for pre-tax treatment. The host computer may also debit a non-FSA account (for vitamins) and, for example, a medical FSA for cough syrup included in a single request for payment authorization. In one embodiment, method 400 may also include the host computer sending a report similar to step 270 discussed above (step 360). Thus, method 400 contemplates debiting at least one FSA and at least one non-FSA account for one or more items qualifying and one or more items not qualifying for pre-tax treatment that may be included in a single request for payment authorization.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. The scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A computer-implemented method to facilitate a purchase utilizing a tax-advantaged account, comprising the steps of:
   (a) receiving, at a host computer, a request for payment authorization for an item;
   (b) determining whether said item qualifies for pre-tax treatment; and
   (c) when said item qualifies for pre-tax treatment:
      (i) determining at least partial payment authorization for said item,
      (ii) transmitting said at least partial payment authorization for said item to a point of sale device, and
      (iii) causing the tax-advantaged account to be debited for at least a portion of the purchasing amount of said item based on said payment authorization; and
   (d) debiting a non tax-advantaged account for an item not qualifying for pre-tax treatment.

2. The computer-implemented method of claim 1, wherein said item is any pre-tax eligible expense, including, but not limited to, one or more of:
   a medical expense;
   a dependent care expense;
   a childcare expense;
   a work-related parking expense; and
   a work-related transportation expense.

3. The computer-implemented method of claim 1, wherein said step of receiving a request comprises receiving at least one item identifier to identify said item, wherein said item identifier includes, but is not limited to, one or more of:
   merchant name;
   price;
   a stockkeeping unit (SKU);
   or any information in the authorization request.

4. The computer-implemented method of claim 1, wherein said step of receiving a request comprises the step of:
   (d) receiving at least one item identifier to identify said item; and
   (e) wherein said step of determining at least partial payment authorization comprises the steps of:
      (i) matching said at least one item identifier with an item identifier for an item that qualifies for pre-tax treatment, and
      (ii) classifying said item as qualifying for pre-tax treatment based on said matching step.

5. The computer-implemented method of claim 1, wherein each step occurs in real-time.

6. The computer-implemented method of claim 1, further comprising receiving a transaction fee from at least one of a merchant transmitting said request for payment authorization to said host computer, said tax-advantaged account, a consumer purchasing said item and an administrator of said tax-advantaged account.

7. The computer-implemented method of claim 1, further comprising crediting a discount amount to said tax-advantaged account.

8. The computer-implemented method of claim 1, wherein causing the one tax-advantaged account to be debited comprises the steps of:
   determining a type of flexible tax-advantaged account of one of a first tax-advantaged account and a second tax-advantaged account; and
   debiting at least one of said first tax-advantaged account and said second tax-advantaged account according to a type of item matching said type of tax-advantaged account.

9. A method according to claim 1, wherein said tax-advantaged account is a flexible spending account.

10. A computer-implemented method to facilitate a purchase utilizing a flexible spending account, comprising the steps of:
    (a) receiving, at a host computer, a request for payment authorization for an item;
    (b) determining whether said item qualifies for pre-tax treatment; and
    (c) when said item qualifies for pre-tax treatment:
       (i) determining at least partial payment authorization for said item,
       (ii) transmitting said at least partial payment authorization for said item to a point of sale device, and
       (iii) causing the flexible spending account to be debited for at least a portion of the purchasing amount of said item based on said payment authorization, wherein said step of causing the flexible spending account to be debited comprises the steps of:
          determining a priority between a first flexible spending account and a second flexible spending account; and
          causing at least one of said first flexible spending account and said second flexible spending account to be debited according to said priority.

11. A method according to claim 10, wherein said second flexible spending account is a line of credit.

12. A method according to claim 11, wherein said tax-advantaged account is a flexible spending account.

13. A computer-implemented method to facilitate a purchase utilizing a flexible spending account, comprising the steps of:
    (a) receiving, at a host computer, a request for payment authorization for an item;
    (b) determining whether said item qualifies for pre-tax treatment; and
    (c) when said item qualifies for pre-tax treatment:
       (i) determining at least partial payment authorization for said item,
       (ii) transmitting said at least partial payment authorization for said item to a point of sale device, and
       (iii) causing the flexible spending account to be debited for at least a portion of the purchasing amount of said item based on said payment authorization, wherein causing the flexible spending account to be debited comprises the steps of:
          determining a priority between a first flexible spending account and a second flexible spending account; and causing at least one of said first flexible spending account and said second flexible spending account to be debited according to said priority, wherein said priority is based on at least one of an expiration date of funds, a greater amount of funds, and a smaller amount of funds in at least one of said first flexible spending account and said second flexible spending account.

14. A method according to claim 13, wherein said second flexible spending account is a line of credit.

15. A machine-readable medium having stored thereon a plurality of instructions, said plurality of instructions when executed by a processor, cause said processor to perform a method comprising the steps of:
(a) receiving, at a host computer, a request for payment authorization for an item;
(b) determining whether said item qualifies for pre-tax treatment; and
(c) when said item qualifies for pre-tax treatment:
   (i) determining at least partial payment authorization for said item,
   (ii) transmitting said at least partial payment authorization for said item to a point of sale device, and
   (iii) causing the tax-advantaged account to be debited for at least a portion of the purchasing amount of said item based on said payment authorization; and
(d) debiting a non tax-advantaged account for an item not qualifying for pre-tax treatment.

16. A method according to claim 15, wherein said tax-advantaged account is a flexible spending account.

17. A system configured to facilitate a purchase utilizing at least one tax-advantaged account, comprising:
a host computer configured to:
receive a request for payment authorization for an item,
determine at least partial payment authorization based upon whether said item qualifies for pre-tax treatment,
transmit at least partial payment authorization to a point of sale device when said item qualifies for pre-tax treatment,
cause a tax-advantaged account to be debited for at least a portion of the purchasing amount of said item based on said payment authorization; and
debit a non tax-advantaged account for an item not qualifying for pre-tax treatment; and
a communication device coupled to said host computer to facilitate communication between said host computer and at least one external device.

18. A method according to claim 17, wherein said tax-advantaged account is a flexible spending account.

19. A computer-implemented method to facilitate a purchase utilizing a tax-advantaged account, comprising the steps of:
(a) receiving, at a host computer, a request for payment authorization for an item;
(b) determining whether said item qualifies for pre-tax treatment; and
(c) when said item qualifies for pre-tax treatment:
   (i) determining at least partial payment authorization for said item,
   (ii) transmitting said at least partial payment authorization for said item to a point of sale device, and
   (iii) causing the tax-advantaged account to be debited for at least a portion of the purchasing amount of said item based on said payment authorization, wherein said step of causing the tax-advantaged account to be debited comprises the steps of:
      determining a priority between a first tax-advantaged account and a second tax-advantaged account; and
      causing at least one of said first tax-advantaged account and said second tax-advantaged account to be debited according to said priority.

20. A method according to claim 19, wherein said second tax-advantaged account is a flexible spending account.

21. A method according to claim 19, wherein said second tax-advantaged account is one of a medical account, a dependent care account, a child care account, health reimbursement account or a flexible spending account.

22. A computer-implemented method to facilitate a purchase utilizing a tax-advantaged account, comprising the steps of:
(a) receiving, at a host computer, a request for payment authorization for an item;
(b) determining whether said item qualifies for pre-tax treatment; and
(c) when said item qualifies for pre-tax treatment:
   (i) determining at least partial payment authorization for said item,
   (ii) transmitting said at least partial payment authorization for said item to a point of sale device, and
   (iii) causing the tax-advantaged account to be debited for at least a portion of the purchasing amount of said item based on said payment authorization, wherein causing the tax-advantaged account to be debited comprises the steps of:
      determining a priority between a first tax-advantaged account and a second tax-advantaged account; and
      causing at least one of said first tax-advantaged account and said second tax-advantaged account to be debited according to said priority, wherein said priority is based on at least one of an expiration date of funds, a greater amount of funds, and a smaller amount of funds in at least one of said first tax-advantaged account and said second tax-advantaged account.

23. A method according to claim 22, wherein said second tax-advantaged account is a flexible spending account.

24. A method according to claim 22, wherein said second tax-advantaged account is one of a medical account, a dependent care account, a child care account, health reimbursement account or a flexible spending account.

25. A computer-implemented method to facilitate a purchase utilizing a tax-advantaged account, comprising the steps of:
(a) receiving, at a host computer, a request for payment authorization for an item;
(b) determining whether said item qualifies for pre-tax treatment; and
(c) when said item qualifies for pre-tax treatment:
   (i) determining at least partial payment authorization for said item, and
   (ii) causing the tax-advantaged account to be debited for at least a portion of the purchasing amount of said item based on said payment authorization; and
(d) debiting a non-tax-advantaged account for an item not qualifying for pre-tax treatment.

* * * * *